Jan. 24, 1956  J. D. BEESON  2,731,880
WEIGHING SCALE APPARATUS WITH LIGHT BEAM INDICATING MEANS
Filed Nov. 2, 1951

INVENTOR.
John D. Beeson
BY Warren F. Schmieding
his Attorney

United States Patent Office 2,731,880
Patented Jan. 24, 1956

2,731,880

WEIGHING SCALE APPARATUS WITH LIGHT BEAM INDICATING MEANS

John D. Beeson, Columbus, Ohio, assignor to The Exact Weight Scale Company, Columbus, Ohio, a corporation of Ohio Application November 2, 1951, Serial No. 254,498

4 Claims. (Cl. 88—24)

The present invention relates generally to a weighing apparatus having a light responsive calibrated dial and more particularly the utilization of a curved mirror method of dial indication.

The curved mirror of the present invention is utilized to magnify a light response transmitted to a light responsive element, as for example the translucent calibrated dial of a weighing scale.

One embodiment of the present invention includes a light source, a screen positioned to progressively intercept the light rays from the light source with the screen being movable responsive to variations in the weight of an object being weighed. A convex mirror is positioned in the path of the light rays, and a translucent dial is provided to receive the light rays reflected from the curved mirror. By positioning the weight responsive movable screen between the light source and the convex reflecting element, I have provided an apparatus for producing a large response or shadow movement on the translucent dial when the weight responsive screen is only slightly moved. Thus the accurate weighing of objects is facilitated.

For illustrative purposes the present invention is shown applied to a scale for sensitive weighing, in which the curved mirror provides a simple method of magnifying the motion imparted to a pivoted balance arm or beam so that a sensitive weighing apparatus can be fabricated without the use of expensive projecting lenses.

The curved mirror of the present invention is also utilized to direct the proper light intensity to the translucent dial of a weighing apparatus since the light intensity is a function of the radius of the curved reflecting surface. For example, if a large radius of curvature is selected, the light rays leaving the curved mirror will be only slightly diverged and therefore the translucent dial will receive a high intensity of illumination. Conversely, if a mirror is designed having a small radius of curvature, the light reflected therefrom will be greatly diverged to produce a low intensity of illumination on the translucent dial.

A further advantage of the present invention is provided by the curved mirror in that the amount of shadow movement on the dial for a given movement of the weight responsive screen can be controlled by the selection of the radius of the curved mirror. A more sensitive weighing apparatus will result if a small radius of curvature is selected. Less sensitive dial indication can be achieved by using a curved mirror having a large radius of curvature.

Further definitions, results and advantages of the present invention will be apparent from the following description, reference being had to the accompanying drawings, wherein several embodiments of the invention are illustrated.

Figure 1:
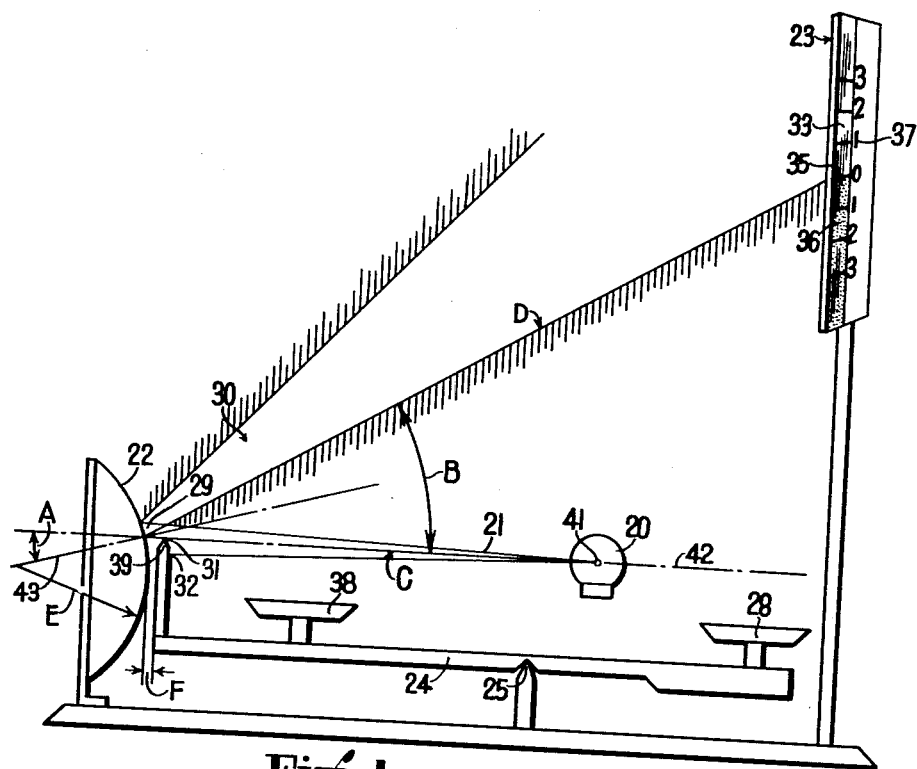
Fig. 1 is a schematic view showing an embodiment of the present invention.

Referring to the drawings, Fig. 1 shows a light source 20 emitting light rays 21 upon the curved mirror reflecting surface 22. The light rays reflected from the curved mirror are directed to fall on a dial 23 which may be translucent or opaque. Balance arm or beam 24 is pivotally mounted on bearing 25 and screen 39 is mounted on the balance arm and positioned to progressively interrupt the beam of light 21. Pan 28 and 38 are carried on the balance arm for receiving objects to be weighed and standard weights respectively.

The beam of light rays emitted from light source 20 has a light-to-mirror segment shown at 21 and a mirror-to-dial segment shown at 30. The mirror surface 22 is convexly curved to diverge the beam segment 21 into the larger diverging beam segment 30. When the screen 39 is moved to interrupt beam segment 21, the light rays striking the screen between points 31 and 32 will be excluded from striking the mirror surface 22 and therefore they will not be reflected to dial 23. The exclusion of this portion of the beam of light causes shadow area 36 on the translucent dial 23 below line 35. The sharp delineation 35 between the shadow area 36 and the lighted area 33 serves as an indicator to register with calibrations 37 on dial 23.

Elements other than screen 39 could be arranged responsively movable to weight variations in objects being weighed, but in the embodiments shown I prefer to move the screen 39.

Figure 2:
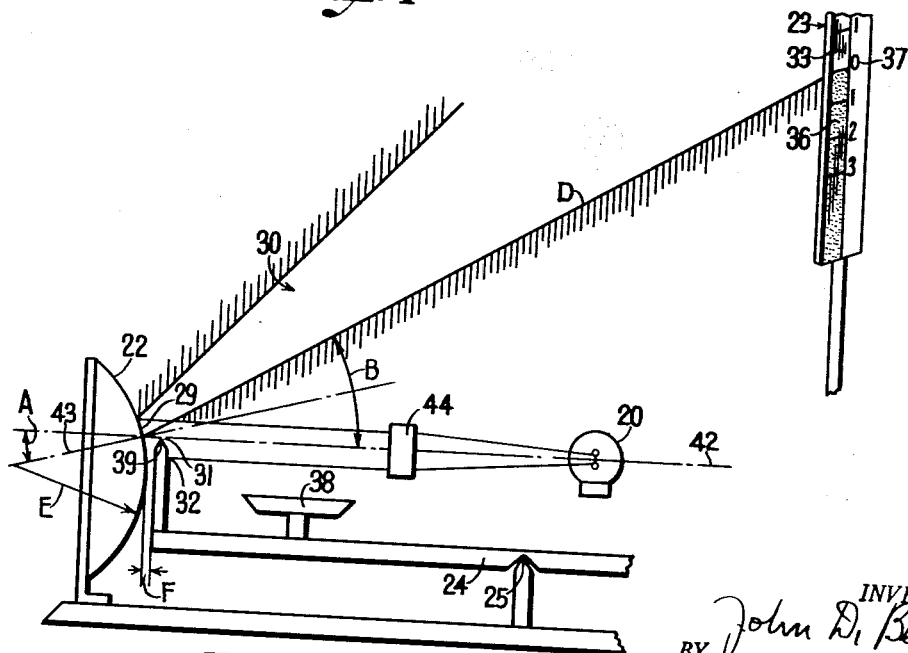
Fig. 2 is a schematic view showing second embodiment of the present invention.

Fig. 2 shows an arrangement of the present invention having an element 44 which can be a collimator or a polarizing screen located between light source 20 and screen 39 along the path of the light rays. The collimator and polarizing screen are refinements that may be used to adapt certain types of light sources to this invention, but it should be noted that the presence or omission of these elements in the system will not substantially vary the spirit of applicant's invention.

Referring again to Fig. 1, certain preferred angles and dimensions are alphabetically designated to show a configuration that I utilize to obtain the proper sensitivity in a compactly constructed weighing apparatus. Screen 39 is of such a height that horizontal axis 42 will pass over knife edge 31 and also pass thru filament 41 when balance arm 24 is horizontally in balance. The radius E of reflector 22 is one inch and the center of curvature of reflector 22 lies on axis 43 which is inclined with the horizontal at angle A which is 15°. The axis 43 is arranged to just pass over knife edge 31. The distance F between screen 39 and reflector 22 is approximately one-sixteenth of an inch. With this configuration, the rays of light passing over knife edge 31 strike reflector 22 and are reflected therefrom at an angle B which is inclined 30° with the horizontal. The lengths C and D of the beam segments are three and one-half inches and five and seven-eighths inches respectively.

In operation, an object to be weighed is placed on the pan 28. Standard weights of known values are placed in pan 38 to balance the pivoted arm 24. The screen 39 is positioned in a predetermined location so that it will cast a shadow at 36 on dial 23 when the balance arm 24 is in the level, balanced position. The knife edge 31 of screen 39 will produce the sharp delineation 35 between lighted area 33 and shadow area 36 on dial 23.

If the standard weights placed in pan 38 are not in balance with the object of unknown weight placed in pan 28, the balance arm 24 will move from the level position shifting screen 39 and the sharp delineation 35 will register with calibrations other than zero on dial 23. For example, the calibrations can be marked out in ounces or fractions thereof, so that an operator, observing the calibration with which sharp delineation 35 registers, can tell by how much the object being weighed is underweight or overweight, depending on which side of the zero calibration the sharp delineation 35 has come to rest.

It is to be understood that the words "beam of light" or "rays of light in beam-like form" comprehend the pencil rays or parallel rays of light shown in the embodiments of Figs. 1 and 2.

While the forms of embodiments of the present invention as herein disclosed constitute preferred forms, it is to be understood that other forms might be adopted, all coming within the scope of the claims which follow.

I claim:

1. In a weighing apparatus, in combination, a scale beam; means forming a light source for emitting rays of light in substantially beam-like form; a convex spherical reflecting means disposed in the path of said rays of light, the principal axis of the spherical reflecting means being arranged parallel with and spaced from the axis of the rays; a screen means adjacent the reflecting means and interposable in the path of the rays of light, said screen means having an area at least equal to the cross sectional area of the rays of light adjacent the reflecting means, said screen means having a leading edge in straight line form, one of said means being attached to and movable with the scale beam; and a reference scale dial disposed in the path of light rays reflected from the reflecting means.

2. In a weighing apparatus, in combination, a scale beam; means forming a light source for emitting rays of light in substantially beam-like form; a convex spherical reflecting means disposed in the path of said rays of light, the principal axis of the spherical reflecting means being arranged parallel with and spaced from the axis of the rays; a screen means adjacent the reflecting means and interposable in the path of the rays of light, said screen means having an area at least equal to the cross sectional area of the rays of light adjacent the reflecting means, said screen means having a leading edge in straight line form, said screen means being attached to and movable with the scale beam; and a reference scale dial disposed in the path of light rays reflected from the reflecting means.

3. In a weighing apparatus, in combination, a scale beam; means forming a light source for emitting parallel rays of light; a convex spherical reflecting means disposed in the path of said rays of light, the principal axis of the spherical reflecting means being arranged parallel with and spaced from the axis of the rays; a screen means adjacent the reflecting means and interposable in the path of the rays of light, said screen means having an area at least equal to the cross sectional area of the rays of light adjacent the reflecting means, said screen means having a leading edge in straight line form, one of said means being attached to and movable with the scale beam; and a reference scale dial disposed in the path of light rays reflected from the reflecting means.

4. In a weighing apparatus, in combination, a scale beam; means forming a light source for emitting rays of light in substantially beam-like form, said means including a polarizing element interposed in the rays of light; a convex spherical reflecting means disposed in the path of said rays of light, the principal axis of the spherical reflecting means being arranged parallel with and spaced from the axis of the rays; a screen means adjacent the reflecting means and interposable in the path of the rays of light, said screen means having an area at least equal to the cross sectional area of the rays of light adjacent the reflecting means, said screen means having a leading edge in straight line form, one of said means being attached to and movable with the scale beam; and a reference scale dial disposed in the path of light rays reflected from the reflecting means.

References Cited in the file of this patent

UNITED STATES PATENTS

| | | |
|---|---|---|
| 1,655,386 | Craig | Jan. 3, 1928 |
| 1,740,130 | Von Voss et al. | Dec. 17, 1929 |
| 2,244,523 | Hess | June 3, 1941 |
| 2,245,970 | Frantz | June 17, 1941 |
| 2,273,591 | Powell | Feb. 17, 1942 |
| 2,291,152 | Carter | July 28, 1942 |
| 2,322,813 | Beck | June 29, 1943 |
| 2,343,621 | Williams | Mar. 7, 1944 |
| 2,461,623 | Amerding | Feb. 15, 1949 |
| 2,471,800 | Von Mulinen | May 31, 1949 |
| 2,583,690 | Feuer | Jan. 29, 1952 |

FOREIGN PATENTS

| | | |
|---|---|---|
| 369,369 | Great Britain | Mar. 24, 1932 |